United States Patent
Tai et al.

(10) Patent No.: US 8,411,207 B1
(45) Date of Patent: Apr. 2, 2013

(54) DEVICE FOR OUTPUTTING LUMINANCE SIGNAL AND METHOD THEREOF

(75) Inventors: Albert Hua Tai, Hsinchu (TW); Feng Chi Wei, Hsinchu (TW); Heng Yi Liu, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 13/339,107

(22) Filed: Dec. 28, 2011

(51) Int. Cl.
*H04N 9/77* (2006.01)
*H04N 9/78* (2006.01)
*H04N 5/21* (2006.01)

(52) U.S. Cl. ........ 348/663; 348/666; 348/712; 348/624; 348/630

(58) Field of Classification Search .................. 348/663, 348/665–667, 669, 670, 712, 607, 624, 625, 348/630, 631; *H04N 9/77, 9/78, 5/21*
See application file for complete search history.

(56) References Cited

U.S. PATENT DOCUMENTS 7,468,758 B2 * 12/2008 Chen .............................. 348/669
2006/0125967 A1 * 6/2006 Huang et al. .................. 348/663

* cited by examiner

*Primary Examiner* — Sherrie Hsia

(57) ABSTRACT

A device for outputting a luminance signal and a method thereof are disclosed. The device includes an image smoothing unit, a band pass filter unit, and a summing unit. The image smoothing unit receives a 2D luminance signal and decreases a signal intensity of a component of the 2D luminance signal within a frequency range with respect to a carrier frequency of a chrominance component. The band pass filter unit passes the component of the 2D luminance signal within the frequency range with respect to the carrier frequency. The summing unit sums the output of the image smoothing unit and the output of the band pass filter unit to generate a resultant luminance signal. The present invention is capable of avoiding the occurrence of saw-tooth or sparkling situation caused by inharmonious switching between a 1D comb filter and a 2D comb filter.

16 Claims, 5 Drawing Sheets

DEVICE FOR OUTPUTTING LUMINANCE SIGNAL AND METHOD THEREOF

TECHNICAL FIELD OF THE INVENTION

The present invention relates to an image processing technique, more particularly, to a device for outputting a luminance signal and a method thereof.

BACKGROUND OF THE INVENTION

A composite video signal comprises a luminance signal (Y) and a chrominance signal (C). A comb filter is commonly used to separate the luminance signal and the chrominance signal from the composite video signal. The process of separating the luminance signal and the chrominance signal is referred to as a Y/C separation.

There are three types of comb filters used to separate the luminance signal and the chrominance signal of the composite video signal. The three types of comb filters include a one-dimensional (1D) comb filter, a two-dimensional (2D) comb filter and a three-dimensional (3D) comb filter. The 1D comb filter and the 2D comb filter are referred to as non-3D comb filters. In general, the non-3D comb filter is used to separate the luminance signal and the chrominance signal when a frame is under a motion condition, and the 3D comb filter is used to separate the luminance signal and the chrominance signal when the frame is under a static condition.

Particularly, the 1D comb filter or the 2D comb filter is selected to provide an output thereof according to points of the frame. When a luminance signal of one point is determined to be more similar to luminance signals of neighboring points adjacent to the one point in a horizontal direction, the 1D comb filter is selected. When the luminance signal of the one point is determined to be more similar to luminance signals of neighboring points adjacent to the one point in a vertical direction, the 2D comb filter is selected. However, a saw-tooth or sparkling situation occurs because of inharmonious switching between the 1D comb filter and the 2D comb filter.

Therefore, there is a need for a solution to avoid the occurrence of the saw-tooth or sparkling situation because of the inharmonious switching between the 1D comb filter and the 2D comb filter.

SUMMARY OF THE INVENTION

An objective of the present invention is to provide a device for outputting a luminance signal and a method thereof.

In accordance with an aspect of the present invention, a device for outputting a luminance signal in an image processing system comprises an image smoothing unit, a band pass filter unit, and a summing unit. In the system, a composite video signal has a chrominance component and a luminance component. A 2D comb filter receives the composite video signal of a frame and outputs a 2D luminance signal based on the luminance component. The chrominance component is modulated onto a carrier frequency. The image smoothing unit receives the 2D luminance signal and decreases a signal intensity of a component of the 2D luminance signal within a frequency range with respect to the carrier frequency of the chrominance component. The band pass filter unit passes the component of the 2D luminance signal within the frequency range with respect to the carrier frequency while filtering out the other components of the 2D luminance signal. The summing unit sums the output of the image smoothing unit and the output of the band pass filter unit to generate a resultant luminance signal.

In one embodiment, the device further comprises an edge enhancement unit. The edge enhancement unit generates a low-frequency component of the composite video signal for enhancing the 2D luminance signal.

In accordance with another aspect of the present invention, a method for outputting a luminance signal in an image processing system comprises the following steps. In the system, a 2D comb filter receives a composite video signal of a frame and outputs a 2D luminance signal. The composite video signal has a luminance component and a chrominance component which is modulated onto a carrier frequency. A signal intensity of a component of the 2D luminance signal within a frequency range with respect to the carrier frequency of the chrominance component is decreased. A component of the 2D luminance signal within the frequency range with respect to the carrier frequency is passed while filtering out the other components of the 2D luminance signal. The component of the 2D luminance signal of which the signal intensity is decreased and the component of the 2D luminance signal within the frequency range with respect to the carrier frequency are summed to generate a resultant luminance signal.

BRIEF DESCRIPTION OF THE DRAWINGS

The present invention will be described in detail in conjunction with the appending drawings, in which.

DETAILED DESCRIPTION OF THE INVENTION

Figure 1:
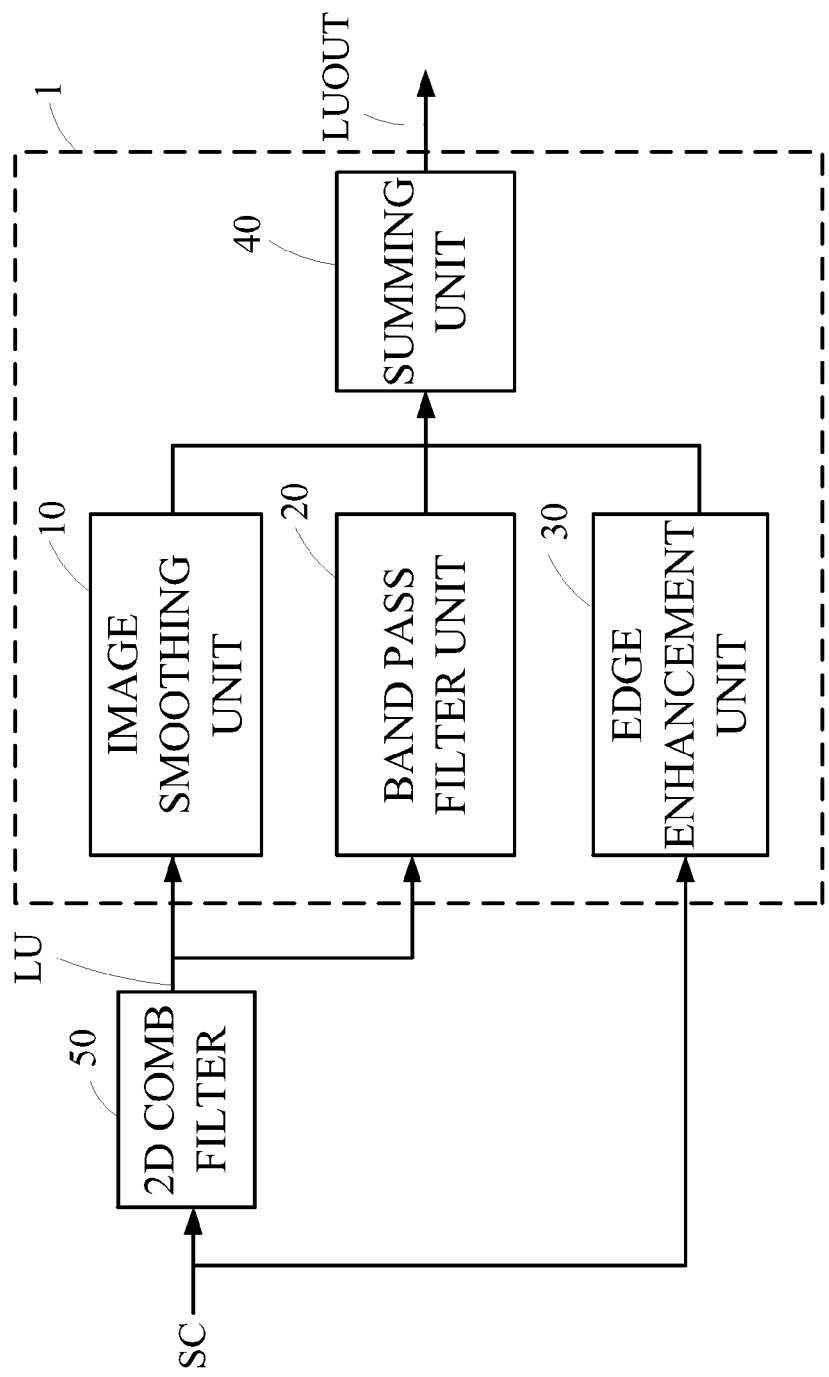
FIG. 1 is a schematic diagram showing an image processing system has a device for outputting a luminance signal in accordance with an embodiment of the present invention.

FIG. 1 is a schematic diagram showing an image processing system has a device 1 for outputting a luminance signal in accordance with an embodiment of the present invention. The device 1 comprises an image smoothing unit 10, a band pass filter unit 20, an edge enhancement unit 30, and a summing unit 40.

In the system, a 2D comb filter 50 receives a composite video signal SC of a frame and outputs a 2D luminance signal LU. The composite video signal SC has a luminance component and a chrominance component which is modulated onto a carrier frequency. The image smoothing unit 10 receives the 2D luminance signal LU and decreases a signal intensity of a component of the 2D luminance signal LU within a frequency range with respect to the carrier frequency of the chrominance component. The band pass filter unit 20 passes a component of the 2D luminance signal LU within the frequency range with respect to the carrier frequency while filtering out the other components of the 2D luminance signal LU. The edge enhancement unit 30 generates a low-frequency component of the composite video signal SC for enhancing the 2D luminance signal LU. The summing unit 40 sums the output of the image smoothing unit 10, the output of the band pass filter unit 20, and the output of the edge enhancement unit 30 to generate a resultant luminance signal LUOUT.

Figure 2:
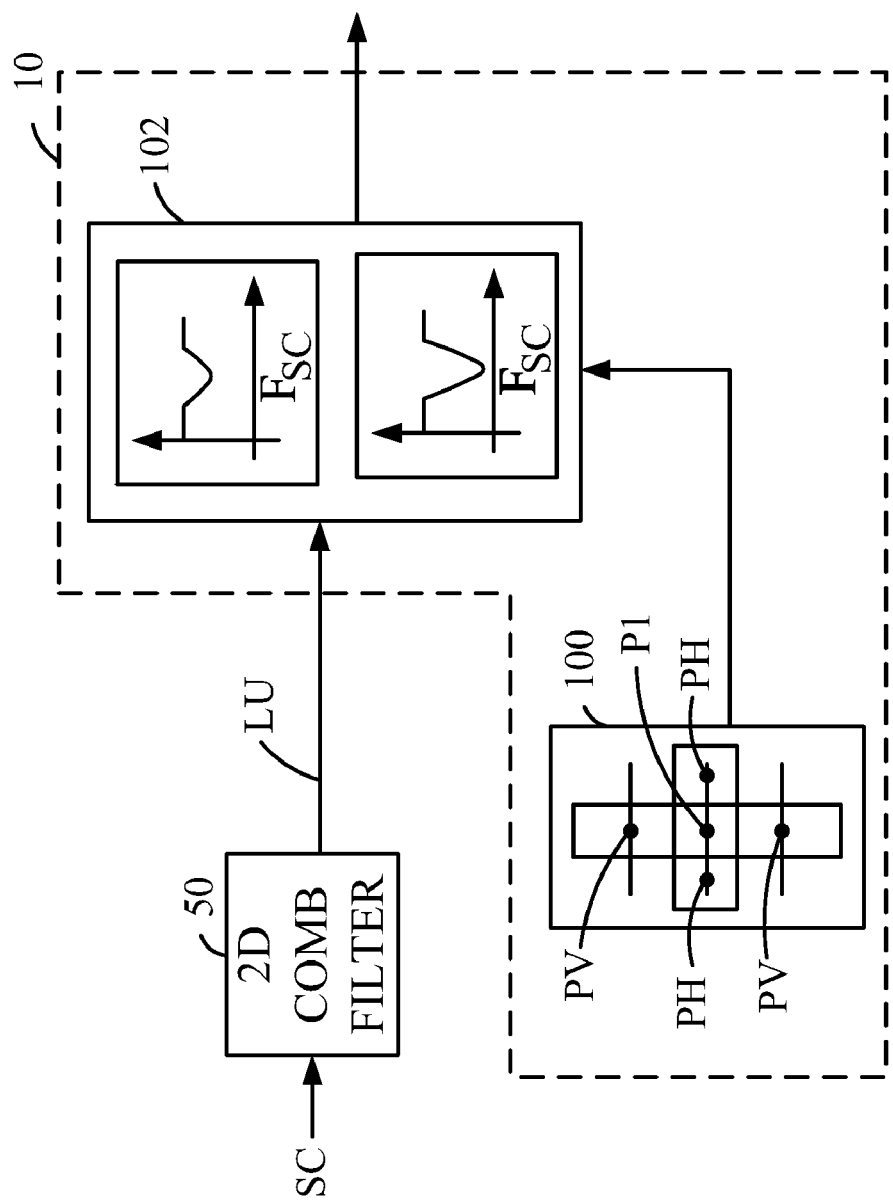
FIG. 2 is a schematic diagram showing an embodiment of the image smoothing unit in FIG. 1.

FIG. 2 is a schematic diagram showing an embodiment of the image smoothing unit 10 in FIG. 1. The image smoothing unit 10 comprises a judgment unit 100 and a notch filter unit 102. The judgment unit 100 judges whether a luminance component of a predetermined point P1 is more similar to luminance components of neighboring points PH adjacent to the predetermined point P1 in a horizontal direction (referred to as a "1D direction") or more similar to luminance components of neighboring points PV adjacent to the predetermined point P1 in a vertical direction (referred to as a "2D direction"). The predetermined point P1 and the neighboring points PH adjacent to the predetermined point P1 in the horizontal direction are positioned in the same scan line (e.g. a current scan line) of the frame. The neighboring points PV adjacent to the predetermined point P1 in the vertical direction are positioned in a previous or next scan line of the current scan line, where the predetermined point is positioned. In the prior arts, when the luminance signal of the predetermined point P1 is similar to the luminance components of the neighboring points PH adjacent to the predetermined point P1 in the horizontal direction, a 1D comb filter is selected to process the composite video signal SC and output a 1D luminance signal. When the luminance component of the predetermined point P1 is similar to the luminance components of the neighboring points PV adjacent to the predetermined point in the vertical direction, a 2D comb filter is selected to process the composite video signal SC and output a 2D luminance signal. Accordingly, the inharmonious switching between the 1D comb filter and the 2D comb filter occurs and leads to the saw-tooth or sparkling situation.

To prevent the saw-tooth or sparkling situation caused by the inharmonious switching between the 1D comb filter and 2D comb filter, the image smoothing unit 10 of the device 1 in accordance with the present invention avoids the inharmonious switching by processing only the 2D luminance signal LU which is extracted from the composite video signal SC by the 2D comb filter 50. More particularly, the notch filter unit 102 receives the 2D luminance signal LU and decreases a signal intensity of the component of the 2D luminance signal LU within the frequency range with respect to the carrier frequency $F_{SC}$ of the chrominance component according to the judgment result of the judgment unit 100.

Figure 3:
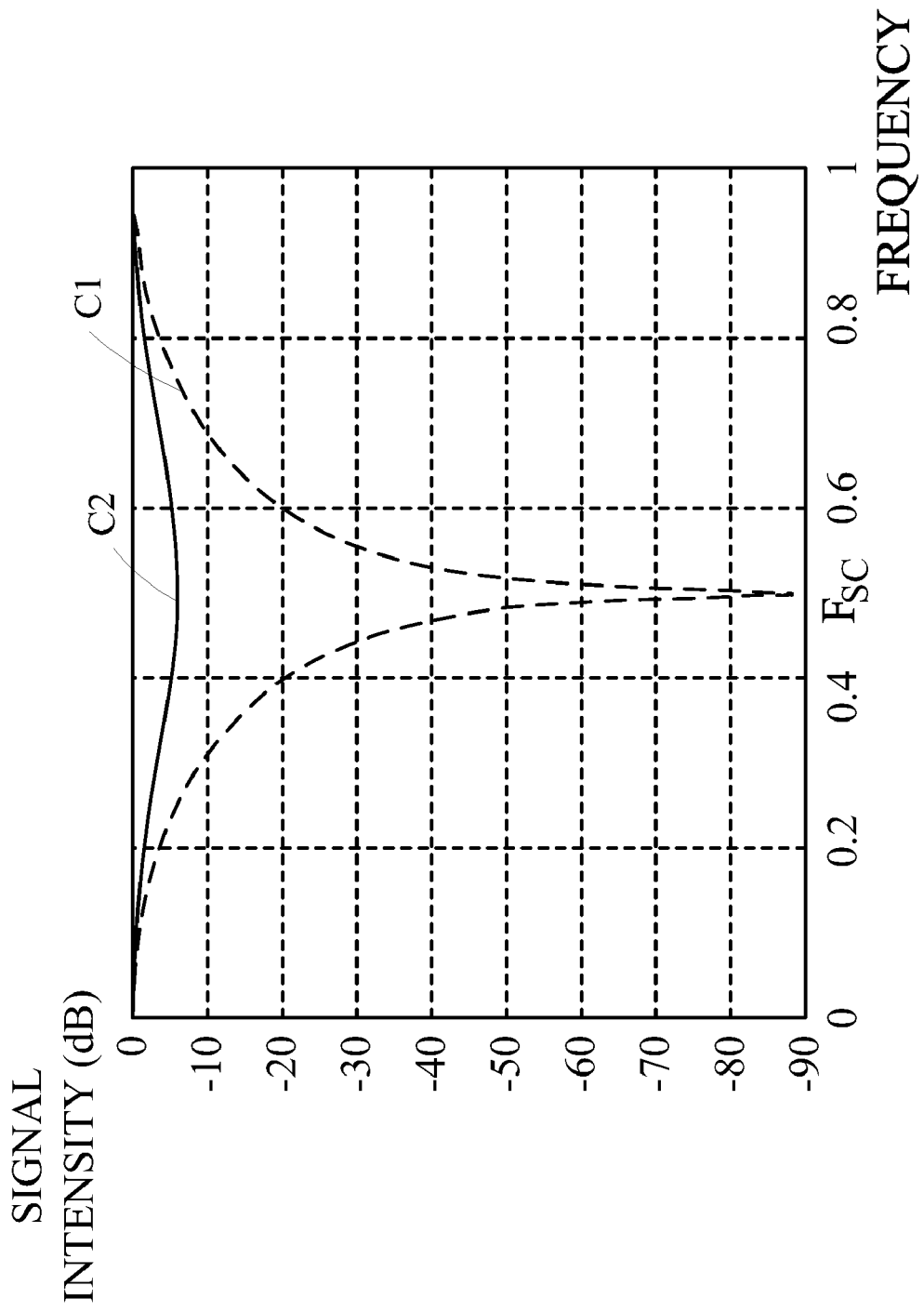
FIG. 3 and is a schematic diagram showing that the composite video signal SC is strongly decreased as a curve C1 and weakly decreased as a curve C2.

When the judgment unit 100 judges the luminance component of the predetermined point P1 is more similar to the luminance components of the neighboring points PH adjacent to the predetermined point in the horizontal direction, the notch filter unit 102 decreases a first degree of signal intensity of the component of the 2D luminance signal LU within the frequency range with respect to the carrier frequency $F_{S/C}$ of the chrominance component. When the judgment unit 100 judges the luminance component of the predetermined point P1 is more similar to the luminance components of the neighboring points PV adjacent to the predetermined point P1 in the vertical direction, the notch filter unit 102 decreases a second degree of signal intensity of the component of the 2D luminance signal LU within the frequency range with respect to the carrier frequency $F_{SC}$ of the chrominance component. Particularly, the first degree is indicative that the 2D luminance signal LU within the frequency range with respect to the carrier frequency $F_{SC}$ of the chrominance component is strongly decreased, while the second degree is indicative that the 2D luminance signal LU within the frequency range with respect to the carrier frequency $F_{SC}$ of the chrominance component is weakly decreased. FIG. 3 is a schematic diagram showing that the 2D luminance signal LU is strongly decreased as a curve C1 and weakly decreased as a curve C2.

Referring back to FIG. 1, the band pass filter unit 20 passes a component of the 2D luminance signal LU within the frequency range with respect to the carrier frequency $F_{SC}$ while filtering out the other components of the 2D luminance signal LU. The frequency range with respect to the carrier frequency $F_{SC}$ is adjustable.

Figure 4:
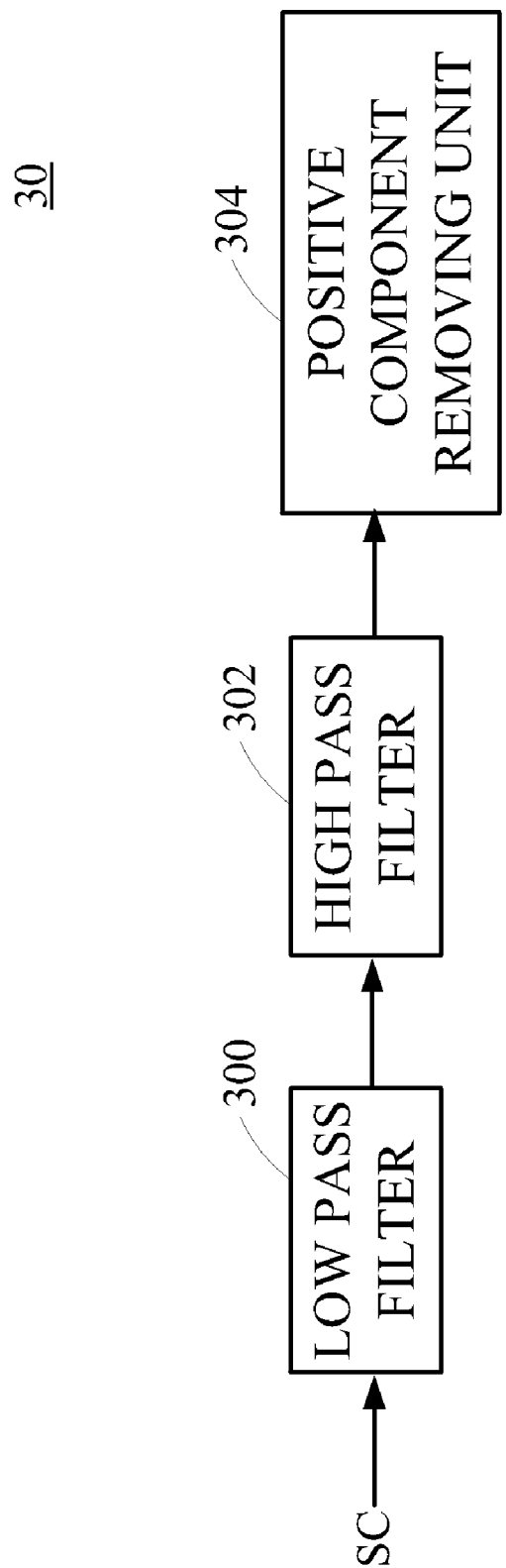
FIG. 4 is a schematic diagram showing an embodiment of the edge enhancement unit in FIG. 1.

The edge enhancement unit 30 receives the composite video signal SC and generates the low-frequency component of the composite video signal SC for enhancing the 2D luminance signal LU. FIG. 4 is a schematic diagram showing an embodiment of the edge enhancement unit 30 in FIG. 1. The edge enhancement unit 30 comprises a low pass filter 300, a high pass filter 302, and a positive component removing unit 304. The low pass filter 300 passes a low-frequency component of the composite video signal SC while filtering out the other components of the composite video signal SC. The high pass filter 302 passes a high-frequency component of the output of the low pass filter 300 while filtering out the other components of the output of the low pass filter 300. More particularly, the high pass filter 302 filters out a DC component of the output of the low pass filter 300. The positive component removing unit 304 removes a positive component from the output of the high pass filter 302. As a result, the positive component removing unit 304 outputs a negative component of the output of the high pass filter 302.

Referring back to FIG. 1, finally the summing unit 40 sums the output of the image smoothing unit 10, the output of the band pass filter unit 20, and the output of the edge enhancement unit 30 to generate the resultant luminance LUOUT. It is noted that the edge enhancement unit 30 is optional in the device 1 in accordance with the present invention.

Figure 5:
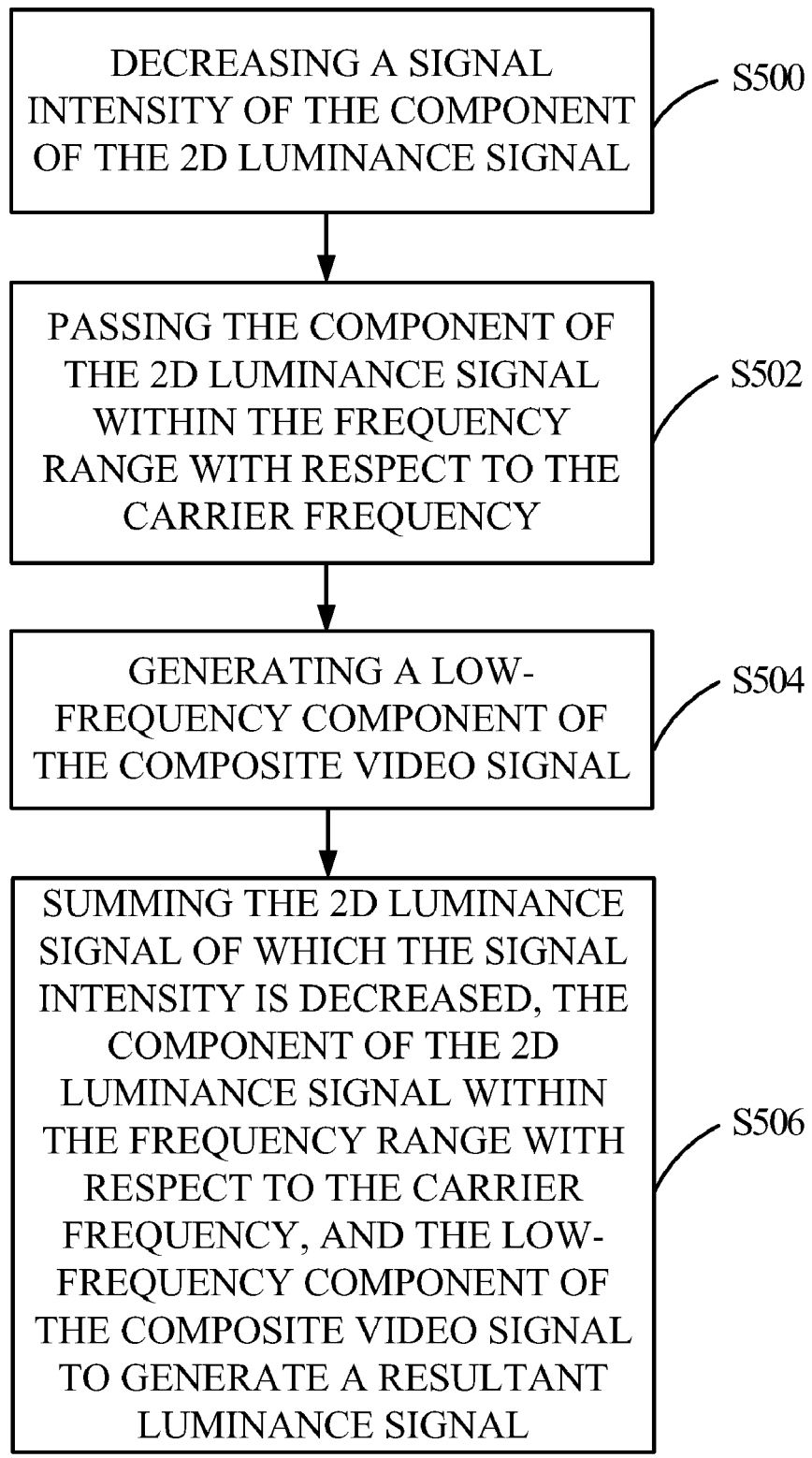
FIG. 5 is a flow chart showing a method for outputting a luminance signal according to the present invention.

Referring to FIG. 5, which is a flow chart showing a method for outputting a luminance signal in an image processing system in accordance to the present invention. More particularly, the method indicates a performing method of the device 1 in FIG. 1. In the image processing system, a 2D comb filter receives a composite video signal of a frame and outputs a 2D luminance signal. The composite video signal has a luminance component and a chrominance component which is modulated onto a carrier frequency. The method includes the following steps. In step 5500, a signal intensity of a component of the 2D luminance signal within a frequency range with respect to the carrier frequency of the chrominance component is decreased. The step 5500 comprises: judging whether a luminance component of a predetermined point of a frame is more similar to luminance components of neighboring points adjacent to the predetermined point in a horizontal direction or more similar to luminance components of neighboring points adjacent to the predetermined point in a vertical direction; and receiving the 2D luminance signal and decreasing the signal intensity of the component of the 2D luminance signal within the frequency range with respect to the carrier frequency of the chrominance component according to the judgment step. When the luminance component of the predetermined point of the frame in the frame is determined to be more similar to the luminance components of the neighboring points adjacent to the predetermined point in the horizontal direction, a first degree of signal intensity of the 2D luminance signal within the frequency range with respect to the carrier frequency of the chrominance component is decreased. When the luminance component of the predetermined point of the frame is determined to be more similar to the luminance components of the neighboring points adjacent to the predetermined point in the vertical direction, a second degree of signal intensity of the 2D luminance signal within the frequency range with respect to the carrier frequency of the chrominance component is decreased.

In step S502, a component of the 2D luminance signal within the frequency range with respect to the carrier frequency is passed while filtering out the other components of the 2D luminance signal. In step S504, a low-frequency component of the composite video signal is generated for enhancing the 2D luminance signal. In step S506, the 2D luminance signal of which the signal intensity is decreased, the component of the 2D luminance signal within the frequency range with respect to the carrier frequency, and the low-frequency component of the composite video signal are summed to generate the resultant luminance signal. It is noted that the frequency range with respect to the carrier frequency of the composite video signal is adjustable.

The device 1 for outputting the luminance signal and the method thereof are capable of decreasing the inharmonious switching between the 1D comb filter and the 2D comb filter in the prior arts, so that the saw-tooth or sparkling situation can be avoided.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A device for outputting a luminance signal in an image processing system, in the system, a composite video signal having a chrominance component and a luminance component, a 2D comb filter receiving the composite video signal of a frame and outputting a 2D luminance signal based on the luminance component, the chrominance component being modulated onto a carrier frequency, the device comprising:
    an image smoothing unit, receiving the 2D luminance signal and decreasing a signal intensity of a component of the 2D luminance signal within a frequency range with respect to the carrier frequency of the chrominance component;
    a band pass filter unit, passing the component of the 2D luminance signal within the frequency range with respect to the carrier frequency while filtering out the other components of the 2D luminance signal; and
    a summing unit, summing the output of the image smoothing unit and the output of the band pass filter unit to generate a resultant luminance signal.

2. The device of claim 1, wherein the image smoothing unit comprises:
    a judgment unit, judging whether a luminance component of a predetermined point of the frame is more similar to luminance components of neighboring points adjacent to the predetermined point in a horizontal direction or more similar to luminance components of neighboring points adjacent to the predetermined point in a vertical direction; and
    a notch filter unit, decreasing the signal intensity of the component of the 2D luminance signal within the frequency range with respect to the carrier frequency of the chrominance component according to the judgment result of the judgment unit.

3. The device of claim 2, wherein when the judgment unit judges the luminance component of the predetermined point of the frame is more similar to the luminance components of the neighboring points adjacent to the predetermined point in the horizontal direction, the notch filter unit decreases a first degree of signal intensity of the component of the 2D luminance signal within the frequency range with respect to the carrier frequency of the chrominance component.

4. The device of claim 3, wherein when the judgment unit judges the luminance component of the predetermined point of the frame is more similar to the luminance components of the neighboring points adjacent to the predetermined point in the vertical direction, the notch filter unit decreases a second degree of signal intensity of the component of the 2D luminance signal within the frequency range with respect to the carrier frequency of the chrominance component.

5. The device of claim 1, further comprising an edge enhancement unit for enhancing a low-frequency component of the composite video signal.

6. The device of claim 5, wherein the edge enhancement unit comprises:
    a low pass filter, passing a low-frequency component of the composite video signal while filtering out the other components of the composite video signal;
    a high pass filter, passing a high-frequency component of the output of the low pass filter while filtering out the other components of the output of the low pass filter; and
    a positive component removing unit, removing a positive component from the output of the high pass filter to output a negative component of the output of the high pass filter.

7. The device of claim 5, wherein the summing unit sums the output of the image smoothing unit, the output of the band pass filter unit, and the output of the edge enhancement unit to generate the resultant luminance.

8. The device of claim 1, wherein the frequency range with respect to the carrier frequency of the chrominance component is adjustable.

9. A method for outputting a luminance signal in an image processing system, in the system, a composite video signal having a chrominance component and a luminance component, a 2D comb filter receiving the composite video signal of a frame and outputting a 2D luminance signal based on the luminance component, the chrominance component being modulated onto a carrier frequency, the method comprising:
    decreasing a signal intensity of a component of the 2D luminance signal within a frequency range with respect to the carrier frequency of the chrominance component;
    passing the component of the 2D luminance signal within the frequency range with respect to the carrier frequency while filtering out the other components of the 2D luminance signal; and
    summing the 2D luminance signal of which the signal intensity is decreased and the component of the 2D luminance signal within the frequency range with respect to the carrier frequency to generate a resultant luminance signal.

10. The method of claim 9, wherein the step of decreasing the signal intensity of the component of the 2D luminance signal within the frequency range with respect to the carrier frequency of the chrominance component comprises:
    judging whether a luminance component of a predetermined point of the frame is more similar to luminance components of neighboring points adjacent to the predetermined point in a horizontal direction or more similar to luminance components of neighboring points adjacent to the predetermined point in a vertical direction; and
    decreasing the signal intensity of the component of the 2D luminance signal within the frequency range with respect to the carrier frequency of the chrominance component according to the judgment result.

11. The method of claim 10, wherein when the luminance component of the predetermined point of the frame is determined to be more similar to the luminance components of the neighboring points adjacent to the predetermined point in the horizontal direction, a first degree of signal intensity of the component of the 2D luminance signal within the frequency range with respect to the carrier frequency of the chrominance component is decreased.

12. The method of claim 11, wherein when the luminance component of the predetermined point of the frame is determined to be more similar to the luminance components of the neighboring points adjacent to the predetermined point in the vertical direction, a second degree of signal intensity of the component of the 2D luminance signal within the frequency range with respect to the carrier frequency of the chrominance component is decreased.

13. The method of claim 11, further comprising a step of generating a low-frequency component of the composite video signal before the summing step.

14. The method of claim 13, wherein the step of generating the low-frequency component of the composite video signal comprises:
(a) passing a low-frequency component of the composite video signal while filtering out the other components of the composite video signal;
(b) passing a high-frequency component of the output in step (a) while filtering out the other components of the output in step (a); and
(c) removing a positive component from the output in step (b) to output a negative component of the output in step (b).

15. The method of claim 13, wherein the 2D luminance signal of which the signal intensity is decreased, the component of the 2D luminance signal within the frequency range with respect to the carrier frequency, and the low-frequency component of the composite video signal are summed to generate the resultant luminance signal.

16. The method of claim 9, wherein the frequency range with respect to the carrier frequency of the chrominance component is adjustable.

* * * * *